United States Patent [19]

Reidenbach et al.

[11] Patent Number: 4,943,875
[45] Date of Patent: Jul. 24, 1990

[54] MAGNETIC DISK FILE HEAD SUSPENSION ASSEMBLY MOUNTING MEANS

[75] Inventors: John R. Reidenbach; Robert E. Schopp, both of Rochester, Minn.

[73] Assignee: International Business Machines Corporation, Armonk, N.Y.

[21] Appl. No.: 257,256

[22] Filed: Oct. 13, 1988

[51] Int. Cl.⁵ .......................... G11B 5/49; G11B 21/16
[52] U.S. Cl. .................................................. 360/104
[58] Field of Search ........................................ 360/104

[56] References Cited

U.S. PATENT DOCUMENTS

| | | | |
|---|---|---|---|
| 4,167,765 | 9/1979 | Watrous | 360/103 |
| 4,796,122 | 1/1989 | Levy et al. | 360/104 |
| 4,829,395 | 5/1989 | Coon et al. | 360/104 |

OTHER PUBLICATIONS

"Assembly . . . Actuator", IBM Tech. Disc. Bull., vol. 25, No. 2, Jul. 1982, pp. 835–836.

*Primary Examiner*—Robert S. Tupper
*Attorney, Agent, or Firm*—F. A. Sirr; Robert W. Lahtinen

[57] ABSTRACT

The head suspension assembly of a magnetic disk file is mounted to the disk file's rigid actuator arm by means of an intermediate, arm-encircling, low profile, mounting band. A number of different mounting bands are disclosed for use in securing the head suspension assembly to the actuator arm. A head suspension assembly is permanently attached to the mounting band during a subassembly manufacturing procedure. The unitary mounting-band/head-suspension subassembly is then removably mounted on the end of the actuator arm by use of the mounting band.

24 Claims, 4 Drawing Sheets

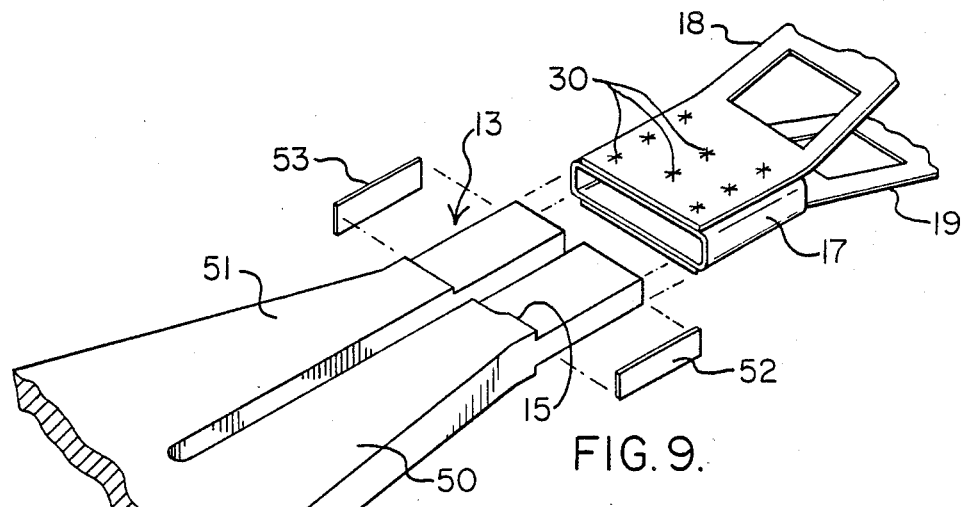
FIG. 9.
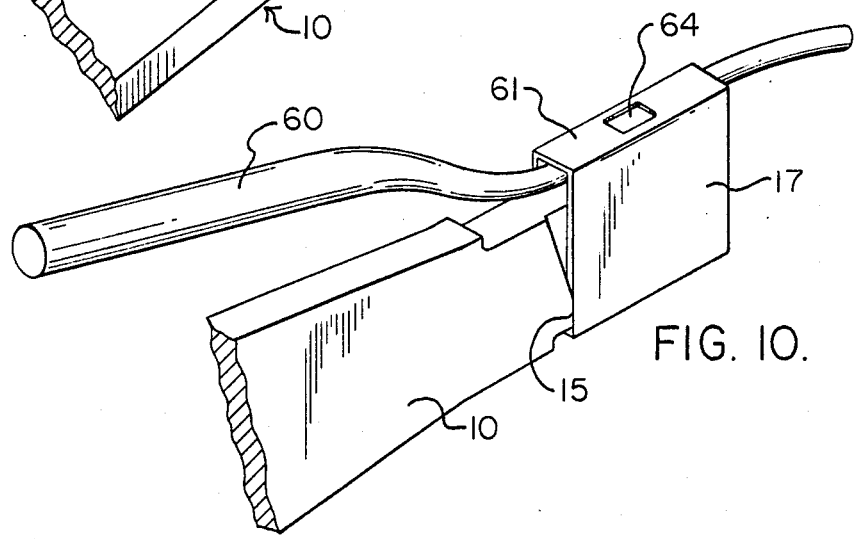
FIG. 10.
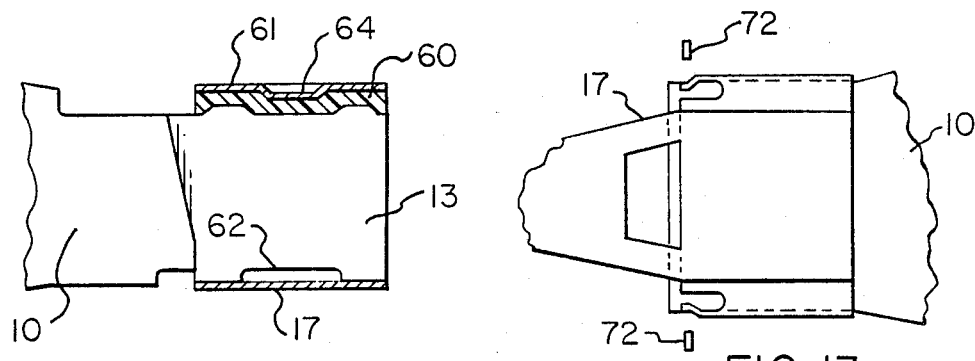
FIG. 11.
FIG. 13.

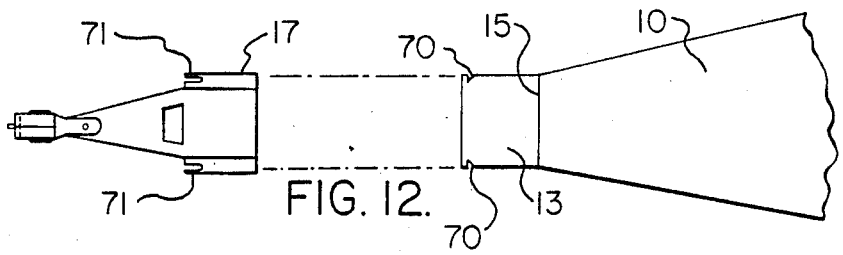
FIG. 12.
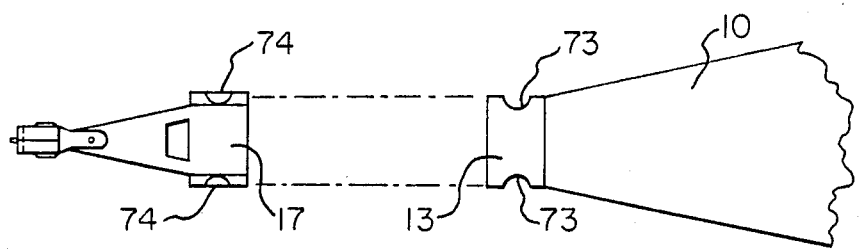
FIG. 14.
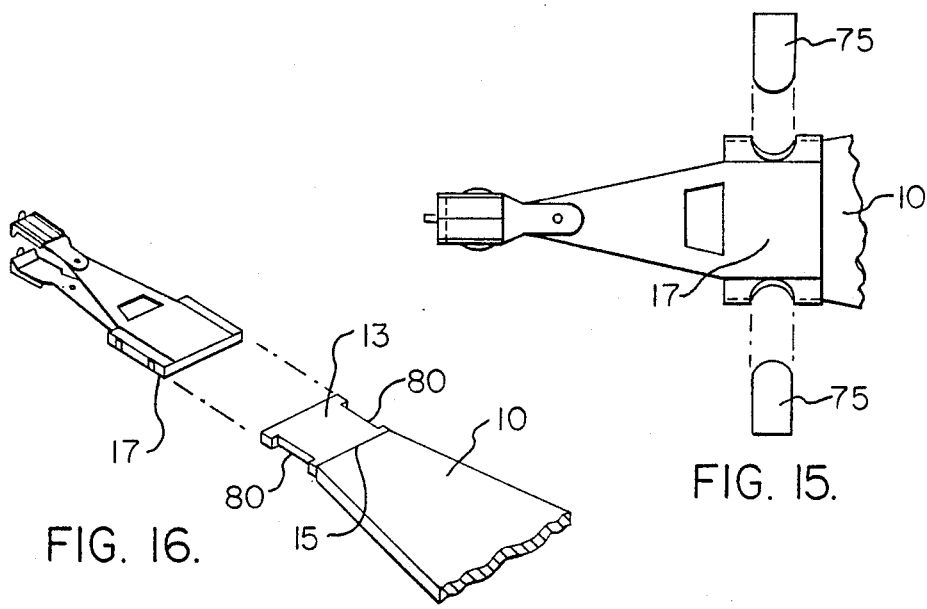
FIG. 15.
FIG. 16.
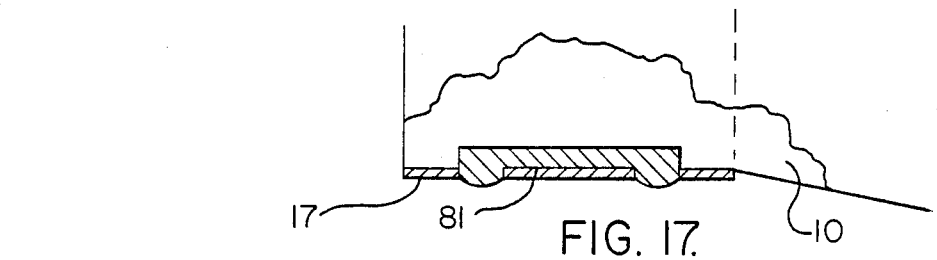
FIG. 17.

MAGNETIC DISK FILE HEAD SUSPENSION ASSEMBLY MOUNTING MEANS

DESCRIPTION

1. Field of the Invention

This invention relates to the field of magnetic disk files or drives, and more specifically to means for mechanically mounting the head suspension assembly, or assemblies, to the rigid actuator arm(s) of the disk file.

2. Background of the Invention

The art of magnetic disk files or drives provides for a magnetic transducing head(s) that closely follow the surface of a rotation magnetic disk(s). The disk is provided with a plurality of recording tracks. A head actuator means operates to move a rigid actuator arm(s) to which the head(s) is mounted by way of a flexible head suspension assembly. In this way, the head is positioned in transducing relation to a desired disk track. The head actuator means usually comprises a linear motor or a rotary motor.

Disk files with which the present invention finds utility, without limitation thereto, may comprise one or more rigid disks having flying heads, or one or more floppy disks having in-contact heads.

While the present invention will be described with reference to a head suspension assembly having particular utility in a rigid disk file, the invention is not to be limited thereto. In addition, the invention will be described with reference to a single actuator arm, recognizing that those skilled in the art will understand that the invention has utility where the head actuator means operates to move multiple actuator arms in relation to multiple disk surfaces.

U.S. Pat. No. 4,167,765 is incorporated herein by reference for the purpose of showing the background of the invention. This patent shows a flying head. The head is carried on a head suspension assembly that is directly mounted onto the end of a rigid actuator arm. More specifically, the head suspension assembly is directly mounted to the arm by the use of screws or welds.

While the prior head suspension assembly direct attachment means has been satisfactory in the past, it is not adaptable to actuator designs using a single piece actuator armature that includes head suspension carrying arms formed integral therewith. This type actuator hub or armature is lower in cost and provides better thermal characteristics than prior stacked arm actuators. However, such an actuator design does not permit access to the major surfaces of the arm to insert screws or use other common attachment techniques. This condition is made more difficult as spacings between disks and consequently the spacing between adjacent actuator arms is decreased to increase the storage capability per unit volume of the disk drive. The technique used with such actuator designs must be capable of assembly from the end of the arm and attachment using access from the side of the arm rather than along the major arm surfaces which are closely adjacent the next adjoining arm. The technique must also meet the usual objectives of low cost, ease of assembly and capability of rework where necessary While in its broad aspects the present invention is not to be limited thereto, the invention has particular utility as an aid to providing higher data storage capacity in a given physical volume. The desire to provide a higher storage capacity in any given volume leads to the design of a disk drive where a number of disks are stacked close together, leaving little space therebetween for the plurality of disk actuator arms. As a result, a number of thin, non-removable, disk actuating arms (three of which are shown at 10, 10' and 10" of FIG. 1) must be located in close spatial relation.

This desirable compact mechanical configuration of a disk file leads to the need for a convenient, low cost, mounting means whereby each head-suspension subassembly (one of which is shown at 16 in FIG. 1) may be mounted to the end of the arm, without requiring an attachment means, such as screw means or welding means, to be inserted into the confined space between the arms as the subassembly is mounted onto the end of the arm.

The tube-like mounting means of the present invention solves this mounting problem by providing a mounting means having a low spatial profile, thus facilitating the ease of mounting/replacement of the head-suspension subassembly in the confined space that exists between the actuator arms of such a high capacity disk drive.

A distinguishing feature of the present invention is that the disk file's head suspension assembly is directly connected or mounted onto an intermediate mounting means, to form a subassembly. Later, the completed mounting-means/ head-suspension subassembly is mounted onto the disk file's actuator arm.

SUMMARY OF THE INVENTION

The present invention provides an apparatus and method whereby a subassembly (also called a head suspension assembly herein), made up of (1) a head-suspension means (2) and a mounting means, is first fabricated. In this fabrication step, the head-suspension means is preferably permanently attached to the mounting means. In preferred embodiments the mounting means is in the form of a hollow mounting band. In its broader aspects, the present invention is not to be limited to this preferred construction and arrangement.

Once the head-suspension/mounting-means subassembly is fabricated, the mounting means portion of the subassembly is used to indirectly mount the head-suspension onto a disk file's actuator arm means.

In this way, fabrication of the relatively fragile subassembly is separated from fabrication of the disk file. The later mounting of the subassembly to the disk file's actuator arm, by virtue of the subassembly's mounting means portion, can now be accomplished much more readily than in the prior art where the head-suspension was directly mounted onto the actuator arm.

As an additional feature of the invention, mounting of the head-suspension to its mounting means may comprise using a permanent mounting means, whereas mounting of the subassembly's mounting means to the actuator arm may comprise using a releasable mounting means. This feature of the invention facilitate later repair and the like of the disk file.

In its broader aspects the method of the present invention comprises manufacturing the actuator-arm / head-suspension portion of a disk file by providing head-suspension means, and actuator-arm means that includes a mounting portion to which said head-suspension means is to be mounted, providing an intermediate mounting member having a first portion adapted to receive said head-suspension means and having a second portion adapted to cooperate with the mounting portion of said actuator-arm means, securing said head-suspension means to the first portion of said mounting member to thereby form a sub assembly, and mounting the subassembly to said actuator-arm means by securing the second portion of said mounting member to the mounting portion of the actuator-arm means.

In its broader aspects the apparatus of the present invention comprises a disk file having a rotatable recording disk having at least one planar recording surface, actuator means operable to move a transducing head to a desired location on the disk's surface, head-suspension means mounting a transducing head at one portion thereof and having a mounting portion spaced therefrom, actuator-arm means having a drive portion connected to the actuator means and having a mounting portion spaced therefrom, an intermediate mounting member having a first portion adapted to mount the head-suspension means and having a second portion adapted to cooperate with the mounting portion of the actuator-arm means, means securing the mounting portion of the head-suspension means to the first portion of the mounting member to thereby form a subassembly, and means securing the subassembly to the mounting portion of the actuator-arm means by the use of the second portion of the mounting member, to thereby indirectly mount the head-suspension means onto the actuator-arm means.

The present invention provides a disk file having a relatively thick and rigid head actuator arm that is operable to support a transducing head relative a recording disk. A hollow tube member is provide, having an internal surface that conforms generally to the shape of the arm's head-supporting end.

A relatively thin and flexible head-suspension blade member mounts the transducing head at one end thereof, and has its other end secured to the external surface of the tube member. These members comprise a head suspension subassembly.

Tube securing means is provided to secure the tube member to the head-supporting end of said actuator arm, with the internal surface of the tube member being located closely adjacent the external surface of the head-supporting end of the actuator arm.

In exemplary embodiments, the tube securing means is selected from the group adhesive means, elastomer means, solder means, or deformable metallic means, some of which means may be heat activated.

The above mentioned deformable metallic securing means may comprise notch means formed in the head-supporting end of the arm, and correspondingly located deformable portions of the tube member that are deformed into the arm's notch means.

In certain embodiments of the invention the actuator arm is split, to thereby form two side-by-side end portions whose shape generally conforms to, but is somewhat larger than, the internal shape of the tube member. In this case, the tube securing means may comprise the side-by-side end portions flexed together, to thereby receive the tube member over the flexed end portions. This tube securing means may include an adhesive means, for example, an adhesive that is heat activated.

In certain embodiments, the actuator arm is split to form two side-by-side end portions whose shape generally conforms to, and is somewhat smaller than, the internal shape of the tube member. In this case, the tube securing means may comprise cam means operable to flexing the arm's side-by-side end portions apart and against the inner surface of the tube member.

In other embodiments, the head-supporting end of the actuator arm is somewhat smaller than the internal shape of the tube member, such that a space exists between the outer surface of the arm and the inner surface of the tube member, to thereby define a cavity. In these embodiments, the tube securing means may comprise means operable to fill the cavity, the means being selected from the group solder means, elastomer means, spring means or deformable means carried by the tube member, for example.

An object of the invention is to provide an intermediate mounting means for use in mounting a head suspension assembly to an actuator arm, said mounting means improving the assembly procedure of a disk file, and improving the ability to rework a disk file that does not meet manufacturing specifications.

It is a further object of the invention to provide a means for mounting a head suspension assembly to an actuator arm, which means does not make use of direct attachment, such as direct screw attachment or direct high temperature weld attachment, of the head suspension assembly to the disk file's actuator arm.

Another object of the invention is to provide a one-piece, pre-assembled, mounting-means / head-suspension subassembly, the subassembly including a mounting-means that is easily mounted onto the end of the disk file's actuator arm.

These and other objects and advantages of the invention will be apparent to those of skill in the art upon reference to the following enabling description of preferred embodiments of the invention, with reference being made to the drawing.

BRIEF DESCRIPTION OF THE DRAWING

FIG. 9 is an exploded view showing a fifth embodiment of the invention, this embodiment having heat activated adhesive strip members for mounting the band to the arm.

FIG. 10 is a perspective view showing a sixth embodiment of the invention, this embodiment having an deformable elastomeric thread-like member for mounting the band to the arm.

FIG. 11 is a section view showing the arm of FIG. 10 with the band mounted thereon.

FIGS. 12 and 14 are perspective exploded views showing seventh and a eighth embodiment of the invention, these embodiments having a mounting band that includes deformable portions that are adapted to cooperate with notches that are formed in the arm.

FIGS. 13 and 15 are views showing the arms of FIGS. 12 and 14, respectively, with the band mounted thereon.

FIG. 16 is an exploded view showing a ninth embodiment of the invention, this embodiment having holes in the band and a cooperating notch are in the arm, such that the band may be mounted to the arm by way of heat activated solder or the like.

FIG. 17 is a section view showing the arm of FIG. 16 with the band mounted thereon.

DETAILED DESCRIPTION OF THE INVENTION

Figure 1:
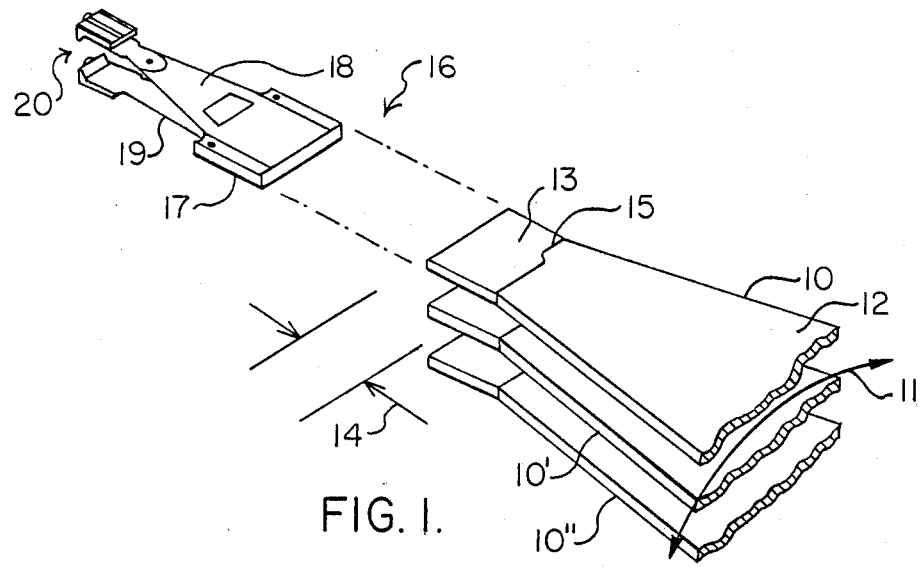
FIG. 1 is a perspective exploded view of a magnetic recording disk file's rigid actuator arm, to which arm a magnetic head suspension assembly is to be mounted by the use of an encircling, low profile, mounting band, in accordance with the generic embodiment of the present invention.

FIG. 1 is an exploded perspective view of the actuator-arm / head-suspension portion of a disk file that is constructed and arranged in accordance with a generic aspect of the present invention.

In this figure, a number of actuator arms 10, 10', 10" are birotationally movable in the direction indicated by arrow 11. The portion 12 of each arm 10 is connected to a rotary actuator, or perhaps to a linear actuator, not shown for purposes of simplicity, but well known to those of skill in the art. The end 13 of each arm 10 is adapted to mount the disk drive's read/write transducing head(s).

While the invention is not to be limited thereto, each arm 10 is a relatively thin, rigid, metallic or plastic arm. Aluminum or magnesium are exemplary materials for arm 10. By way of example, the end portion 13 of the arm is rectangular in cross section, the major axis of the rectangular cross section being about 8.0 mm in length, and the minor axis of the rectangular cross section being about 1.0 mm in length. The length dimension 14 of end portion 13 is about 8.0 mm, for example.

In an embodiment of the invention, the multiplicity of actuator arms 10, 10', 10", etc, were constructed integrally with the actuating motor. These arms were closely spaced, one above the other, and were non-removable from the actuating motor. This actuating structure can be fabricated by machining, by casting, or by plastic molding. The remaining figures, showing other embodiments of the invention, will show only one such arm 10. However, it is to be understood that a plurality of closely stacked arms can be provided, as is desired.

As will be more fully shown in other figures, arm portion 13 includes a raised location surface portion 15 against which the invention's mounting-means / head-suspension subassembly is pressed or located when the subassembly is mounted onto the end 13 of arm 10. Surface 15 accurately locates the subassembly relative arm 10.

Reference numeral 16 identifies the above mentioned mounting-means / head-suspension subassembly. This subassembly includes a mounting-means in the form of a hollow mounting band tube 17. Band 17 is preferably formed of a thin, flexible, metal. For example, stainless steel may be used. The dimensional shape of band 17 closely conforms to the shape of arm end 13. In this way, band 17 may be fitted onto this end of the arm. The manner of mounting band 17 onto arm 13 is not critical to the invention, and various means will be described relative other figures. Band 17 may be made of metal about 0.15 mm thick, for example.

When band 17 is mounted on end 13 of arm 10, the band is pressed onto the arm until it encounters and is stopped by the arm's locating surface portion 15.

Subassembly 16 also includes thin, flexible, metallic blades 18 and 19, made of stainless steel for example. Blades 18,19 may be 0.08 mm thick, for example. The two free ends 20 of blades 18,19 each support a transducing head, for example by way of a flexure mount, in the manner shown in above mentioned U.S. Pat. No. 4,167,765. These elements comprise the head-suspension portion of subassembly 16. It is to be understood that the details of construction and arrangement of the head-suspension portion of subassembly 16 are not critical to the invention.

In accordance with a feature of the invention, blades 18,19 are permanently mounted to band 17, as by welding, whereas band 17 is removably mounted to the end 13 of actuator arm 10, for example by the various mounting means to be described.

As is well known to those of skill in the art, the upper transducing head of subassembly 16 cooperates with the lower recording surface of a disk (not shown) that is located immediately above the subassembly, whereas the lower transducing head that is supported by subassembly 16 cooperates with the upper surface of a disk (not shown) that is located immediately below the subassembly. In this way, each of the subassembly's two transducing heads cooperate with a disk recording surface, and operate to transduce the magnetic recording tracks of a disk, as movement 11 positions the heads at desired disk tracks.

Those skilled in the art will note that the angular arrangement of FIG. 1 suggests use of a rotary actuator to move arms 10, 10' and 10". This is for convenience of illustration only, and the invention is not to be limited thereto.

Figure 2:
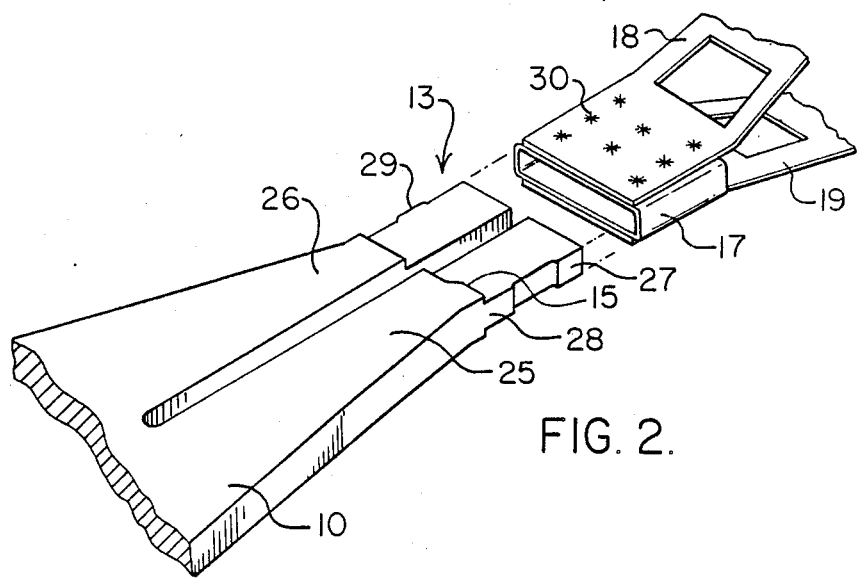
FIG. 2 is a perspective exploded view showing a second embodiment of the invention, wherein the actuator arm end is split, the two actuator arm sections being adapted to be flexed inward to facilitate mounting of the band on the arm.
Figure 3:
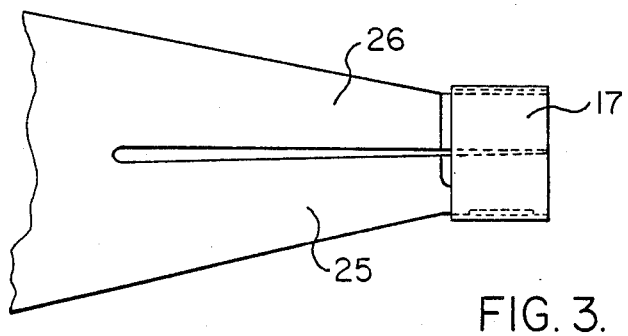
FIG. 3 shows the mounting band of FIG. 2 in operative mounted position on the disk file's rigid actuator arm.

FIGS. 2 and 3 show an embodiment of the invention where actuator arm 10 includes two flexible end portions 25 and 26. The free-state of end portions 25 and 26 is such that tube or band 17 will not fit over the end of arm 00. Attachment of tube 17 to arm 10 is accomplished by flexing arm portions 25,26 inward toward one another, sliding tube 17 over arm portions 25,26, to a registered position against surface 15, and then releasing arm portions 25,26. The side surfaces 27, 28 and 29 of the arm are shaped to provide three symmetrical pressure points against which the inside surface of tube 17 is consistently and securely seated.

As will be appreciated, this construction and arrangement provides for quick, unencumbered and inexpensive attachment and/or replacement of the above mentioned subassembly. In addition, since tube 17 is symmetrical, the tube can be easily oriented in a manufacturing fixture.

After the tube has been mechanically positioned on the arm, against points 15, 27,28 and 29, in this and other embodiments of the invention, a vibrational input force may be applied to the tube, thereby ensuring a firm seating of the tube against these alignment points. In the event that minute foreign particles are present on the arm or on the tube, these particles will be dislodged by such a force, and final accurate seating of the tube will be achieved.

If desired, a laser weld can be provided once tube 17 is correctly positioned on the end 13 of arm 10. As shown at 30, blades 18,19 may be welded to tube 17 during fabrication of the subassembly.

Figure 4:
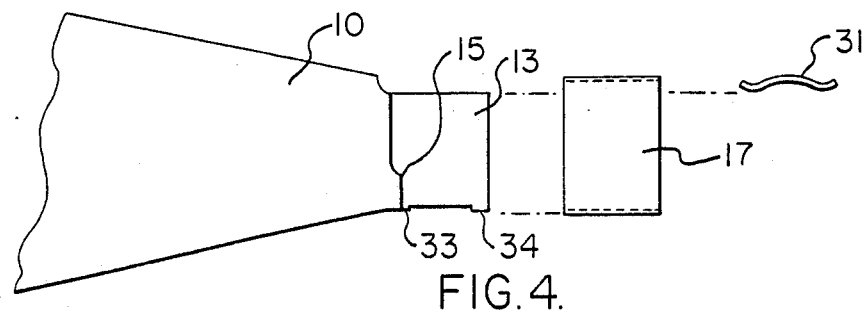
FIG. 4 is an exploded view showing a third embodiment of the invention, wherein a spring member is trapped between the mounting band and the arm, to facilitate mounting of the band onto the arm.
Figure 5:
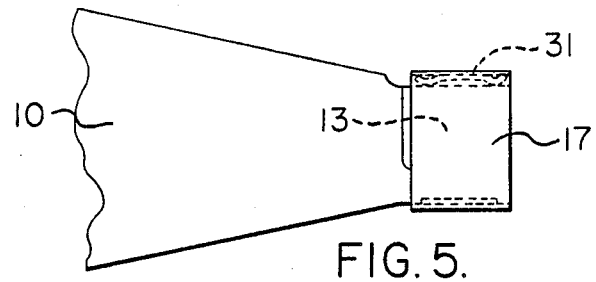
FIG. 5 shows the mounting band of FIG. 4 in operative position on the disk file's rigid actuator arm.

FIGS. 4 and 5 show an embodiment of the invention wherein the mounting tube or band 17 is secured to the end 13 of arm 10 by the use of a metal spring lock member 31. While not specifically shown, it is to be understood that band 17 carries blades 18,19 as above described. In this embodiment the dimension of arm end 13 is such that band 17 snugly fits over the arm end. Attachment of band 17 to arm 10 is effected by sliding the band onto the end 13 of the arm, and then inserting spring lock 31 into the space between the edge of arm 10 and the corresponding inner surface of band 17. Replacement is effected by sliding band 17 off of arm 10, and then installing a new subassembly and its spring lock. One side of arm 10 includes two pressure points 33 and 34. These two pressure points cooperate with the curved shape of spring lock 31 to form three pressure points, for the reasons above mentioned. Spring lock 31 is designed to yield, without fracture, for all gap sizes between arm 10 and the inside surface of band 17 that result from normal manufacturing parts tolerances. This results in a consistent normal force that resists relative slipping movement between the band and the arm.

Figure 6:
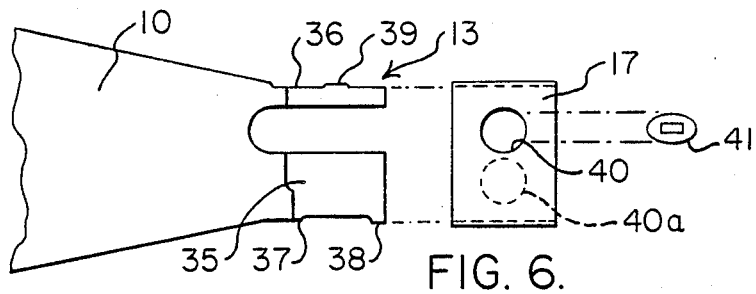
FIG. 6 is an exploded view showing a fourth embodiment of the invention, this embodiment having a locking cam member to facilitate mounting of the band on the arm.
Figure 7:
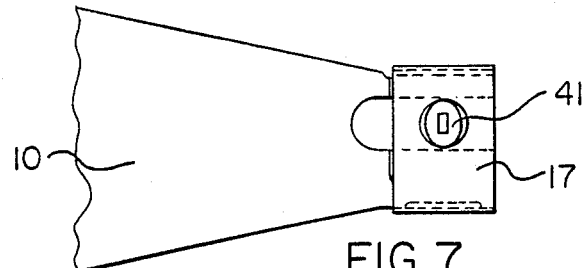
FIG. 7 shows the mounting band of FIG. 6 in operative position on the disk file's rigid actuator arm.
Figure 8:
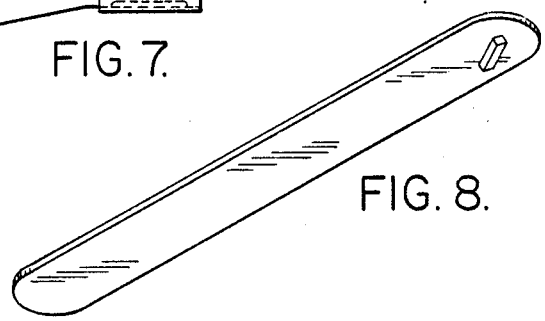
FIG. 8 is a perspective view of a manually operable tool that is used to rotate and thereby lock the locking cam member of FIGS. 6 and 7.

FIGS. 6, 7 and 8 show another embodiment of the invention that utilizes a split-end actuator arm 10. In this embodiment, hollow tube or band 17 is of an internal dimension so as to easily slide over the split end 13 of arm 10, since the free-state width of split end 13 is less than the corresponding internal dimension of band 17. The end 13 of the arm includes a relatively inflexible wide portion 35, and a relatively flexible narrow portion 36. Two band-engaging pressure points 37 and 38 are provided on wide arm portion 38, whereas a single band-engaging pressure point 39 is provided on narrow arm portion 36.

Band 17 includes a pair of symmetrically located holes 40, 40a into one of which a rotatable cam disk 41 is positioned once band 17 has been slipped onto the split end 13 of arm 10, thereby loosely positioning the band over and in encircling relation to arm portions 35,36. As can be seen, hole 40 is in general alignment with the split that is formed in the end 13 of arm 10. Subsequent 90-degree manual rotation of cam disk 41, to a high cam dwell position (not shown) that is provided on the cam disk, as by the use of the FIG. 8 tool, effects a spreading movement of the arm's narrow portion 36 away from the arm's wide portion 35, and effects the locking, mounting, or press fitting of band 17 onto arm 10.

Of course, subsequent opposite direction rotation of cam disk 41, away from its high dwell position, allows the subassembly to be replaced.

FIG. 9 show another embodiment of the invention that utilizes a split-end actuator arm 10. In this embodiment, hollow tube or band 17 is of an internal dimension so that arm portions 50 and 51 must be pressed together, in the manner of the FIGS. 2,3 embodiment, in order to easily slide band 17 over the split end 13 of arm 10, since the free-state width of split end 13 is greater than the corresponding internal dimension of band 17. Multiple internal pressure points (not shown) may be used to control the proper locating of band 17 onto the end 13 of arm 10.

In this embodiment, double-sided adhesive strips 52 and 53 are pre-bonded to the sides of the split-end portion 13 of arm 10. By way of example, strips 52,53 may include a heat-activated adhesive that is not in an adhesive state at room temperature. The use of such an adhesive facilitates the ease of part handling, and the positioning of band 17 over the end of the arm.

As with the FIG. 2,3 embodiment, band 17 of the subassembly is positioned over the ends 50,51 of arm 10 when these ends are flexed together. Subsequent release of ends 50,51 causes the exposed adhesive side of strips 52,53 to engage the inner side of tube 17, and effects a mounting of the subassembly onto arm 10. When heat-activated adhesive is used, heat is applied to band 17 to effect subassembly mounting.

The adhesive of this embodiment of the invention provides a bonded interface between each side of the tube and the arm, thereby providing the proper locating of the tube on the arm.

When a heat activated adhesive is used, subassembly replacement is accomplished by heating the end 13 of arm 10, flexing the split end together, and then removing the subassembly.

FIGS. 10 and 11 show an embodiment of the invention wherein compression of an elastomeric locking member operates to secure subassembly band 17 to the end 13 of arm 10.

In this embodiment, the width of arm end 13 is less than the corresponding dimension of band 17, see FIG. 10. Thus, band 17 can be easily slid over the end 13 of the arm. Once the band is so positioned, and accurately located against registration surface 15, elastomeric locking member 60, in the form of a solid fiber, thread or tube, is threaded between the edge of arm end 13 and the adjacent, internal, narrow edge 61 of band 17. When a full length of member 60 has been located in the space between band 17 and the edge of arm 10, the exposed ends of member 60 are cut off, see FIG. 11.

A preferred physical shape for elastomeric locking member 60 is that the end thereof that is first threaded between the edge of arm end 13 and the adjacent, internal, narrow edge 61 of band 17 is of a small dimension, to thereby facilitate initial threading, whereas the opposite end of the locking member tapers to a large dimension that will fully occupy the space between the arm end and the band. With the tube completely located in an operative position on the arm, the small end of the locking member is threaded into the opening that then exists between the arm and the tube. Subsequent pulling on the small end of the locking member pulls the large portion thereof into this opening. Subsequent stretching of the locking member, by continuing to pull on its small end, stretches the locking member and reduces the diameter of its large end, This enables the locking member to be pulled into the opening between the arm and the tube. When the large portion of the locking member has been stretched by pulling it a sufficient distance into this opening, i.e. far enough to fill the opening, the locking member is released. Releasing the locking member allows it to try to restore to its original large, unstressed shape, and thereby fills the opening and provides a tube locking force.

Subassembly removal and replacement is accomplished by forcing band 17 off of arm end 13.

As can be seen in FIG. 11, the side edge 62 of arm end 13 has two spaced band pressure point surfaces, whereas the other side 63 of this arm end has two spaced bumps that cooperate with a dimple 64 that is formed in the narrow edge 61 of band 17. When elastomeric locking member 60 is in its FIG. 11 position, the locking member essentially fills the cavity between the edge of arm end 13 and the internal surface of band 17. This effects a press fit mounting of the subassembly onto arm 10. This filling of the cavity by elastomer 60 also seats the band against the two locating surfaces that are carried by edge 62 of the arm. As can be seen in FIG. 11, for tube 17 to move axially it must compress elastomeric number 60 between dimple 64 and either of the associated arm bumps within the elastomeric cavity. This feature along with the press fit effect, provided by the elastomeric member, hold the tube securely to the arm.

FIGS. 12 through 15 show embodiments of the invention wherein portions of tube 17 are mechanically deformed or bent into recesses or notches that are carried by the end 13 of arm 10, in order to effect a mounting of the subassembly onto the arm.

With reference to FIG. 12, the end 13 of arm 10 is provided with a pair of leading-edge notches 70. Band 17 includes correspondingly placed tangs 71. The dimension of arm end 13 is such that band 17 may be easily placed over the arm end 13, perhaps with a press fit. Once band 17 is so located, tangs 71 are deformed inward, into notches 70, for example by the use of a tool 72, see FIG. 13.

For removal of a subassembly, it is necessary to bend tangs 71 to their original FIG. 12 position, and then pull band 17 off of arm 10.

The embodiment of FIGS. 14,15 is somewhat similar in that the end 13 of arm 10 is provided with a pair of center-disposed notches 73, and band 17 is provided with correspondingly located deformable edge portions 74. As with the prior embodiment, band 17 is mounted onto the end 13 of arm 10 by operation of punches 75, see FIG. 15.

For removal of a subassembly, it is necessary to bend band edge portions 74 to their original FIG. 14 position, and then pull band 17 off of arm 10.

FIGS. 16 and 17 show an embodiment of the invention that is somewhat similar to the fillable-cavity embodiment of FIGS. 10,11, wherein a cavity space 80 that exists between arm 10 and tube 17, is filled with a heat-activated material such as solder 81, using two small holes that are formed in the corresponding edge of band 17, see FIG. 17, after band 17 has been located on the end 13 of arm 10.

The dimensional size of arm end 13 is such that band 17 may be easily slid over the arm end 13, perhaps with a press fit. Once band 17 is so located, the cavity is filled with solder 81.

For removal of a subassembly, it is necessary to heat solder 81, and then pull band 17 off of arm 10.

The present invention has been described with reference to various embodiments thereof. This description of the invention will enable those skilled in the art to visualize yet other embodiments of the invention. Thus, the scope and content of the invention is to be limited only by the scope and content of the following claims.

What is claimed is:

1. A method of manufacturing an actuator-arm/head-suspension portion of a disk file, comprising;
   providing head-suspension means,
   providing actuator-arm means including a portion to which said head-suspension means is to be attached,
   providing an intermediate band member constructed to encircle said portion of said actuator-arm means, and having a first portion constructed for attachment to said head-suspension means,
   attaching said head-suspension means to the first portion of said band member, to thereby form a subassembly, and
   thereafter attaching said subassembly to said actuator-arm means by encircling said portion of said actuator-arm means with said band member.

2. The method of claim 1 including the steps of providing permanent attachment of said head-suspension means to the first portion of said band member, and providing releasable encirclement of said band member to said portion of said actuator-arm means.

3. In combination with a disk file having a rotatable disk having at least one recording surface, and having actuator means operable to move a transducing head to a desired location on the disk's surface,
   head-suspension means supporting said transducing head at a first portion thereof, and having a second portion spaced from said first portion,
   actuator-arm means having a drive portion connected to said actuator means, and having a mounting portion spaced from said drive portion,
   an intermediate band member, having a first portion constructed for attachment to the second portion of said head-suspension means, and said band member being constructed to encircle the mounting portion of said actuator-arm means,
   means attaching the second portion of said head-suspension means to the first portion of said band member, to thereby form a subassembly, and
   means attaching said subassembly to the mounting portion of said actuator-arm means by the use of said band member, to thereby indirectly attach said head-suspension means onto said actuator-arm means.

4. The disk file of claim 3 wherein the means attaching the second portion of said head-suspension means to the first portion of said band member, to thereby form a subassembly, provides direct permanent attachment of said head-suspension means to said band member, and wherein said means attaching said subassembly to the mounting portion of said actuator-arm means provides releasable attachment of said subassembly to said actuator-arm means.

5. The disk file of claim 3 wherein said head-suspension means comprises a relatively thin and flexible metallic member operable to compliantly support said transducing head relative to the recording surface of said disk, and wherein said actuator-arm means comprises a relatively thick and rigid metallic member operable to noncompliantly support said subassembly.

6. The disk file of claim 4 wherein said head-suspension means comprises a relatively thin and flexible metallic member operable to compliantly support said transducing head relative to the recording surface of said disk, wherein said actuator-arm means comprises a relatively thick and rigid metallic member operable to noncompliantly support said subassembly, and wherein said band member comprises a relatively thin, closed, metallic band.

7. The disk file of claim 6 wherein the outer surface of said band member comprises the first portion of said band member.

8. The disk file of claim 6 wherein said band member comprises a flat profile, four-sided, cylinder, the outer surface of said cylinder comprising the first portion of said band member to which said head-suspension means is attached.

9. The disk file of claim 7 wherein said actuator-arm means includes locating means operable to establish proper attached position of said subassembly on said actuator-arm means.

10. The disk file of claim 8 wherein said actuator-arm means includes a locating surface that is operable to establish proper position for said subassembly on said actuator-arm means.

11. In a disk file,
a relatively flat, thick and rigid head actuator arm operable to support a transducing head relative a recording disk,
said actuator arm having a head-supporting end portion,
a hollow tube member having an external surface, and having an internal surface that conforms generally to the shape of the head-supporting end of said actuator arm,
a relatively flat, thin and flexible head-suspension blade member, having a transducing head mounted at one end thereof, and having the other end thereof secured to the external surface of said tube member, and
tube securing means securing said tube member to the head-supporting end portion of said actuator arm, with the internal surface of said tube member being located closely adjacent the external surface of the head-supporting end portion of said actuator arm.

12. The disk file of claim 11 wherein said tube securing means is selected from the group adhesive means, elastomer means, solder means, or deformable metallic means.

13. The disk file of claim 12 including a plurality of closely stacked actuator arms, each one of which includes a head-supporting end, and each one of which includes a tube member secured thereon.

14. The disk file of claim 11 wherein said securing means is a heat activated means.

15. The disk file of claim 11 wherein said tube securing means comprises notch means formed in the head-supporting end of said arm, and correspondingly located deformable portions of said tube member that are deformed into said notch means.

16. The disk file of claim 15 having a plurality of closely stacked actuator arms, each arm of which includes a head-supporting end, and each head-supporting end of which includes a tube member secured thereon.

17. The disk file of claim 11 wherein said actuator arm is split along its thin dimension, to thereby form two side-by-side end portions whose shape generally conforms to, but is somewhat larger than, the internal shape of said tube member, and wherein said tube securing means comprises said side-by-side end portions flexed together, to thereby receive said tube member.

18. The disk file of claim 17 having a plurality of closely stacked actuator arms, each arm of which includes a head-supporting end, and each head-supporting end of which includes a tube member secured thereon.

19. The disk file of claim 17 wherein said tube securing means includes adhesive means.

20. The disk file of claim 19 wherein said adhesive means is heat activated.

21. The disk file of claim 11 wherein said actuator arm is split in its thin dimension, to thereby form two side-by-side end portions whose shape generally conforms to, and is somewhat smaller than, the internal shape of said tube member, and wherein said tube securing means comprises cam means operable to flexing said side-by-side end portions apart.

22. The disk file of claim 21 including a plurality of closely stacked actuator arms, each one of which includes a head-supporting end, and each one of which includes a tube member secured thereon.

23. The disk file of claim 11 wherein the head-supporting end of said actuator arm is somewhat smaller than the internal shape of said tube member, such that a space exists between the outer surface of said arm and the inner surface of said tube member, to thereby define a cavity, and wherein said tube securing means comprises means operable to fill said cavity selected from the group solder means, elastomer means, spring means or deformable means carried by said tube member.

24. The disk file of claim 23 having a plurality of closely stacked actuator arms, each arm of which includes a head-supporting end, and each head-supporting end of which includes a tube member secured thereon.

* * * * *